(12) United States Patent
Kim et al.

(10) Patent No.: US 10,207,476 B2
(45) Date of Patent: Feb. 19, 2019

(54) REINFORCED LEATHER

(76) Inventors: Ho Jin Kim, Busan (KR); Ho Keun Kim, Gimhae-si (KR)

( * ) Notice: Subject to any disclaimer, the term of this patent is extended or adjusted under 35 U.S.C. 154(b) by 406 days.

(21) Appl. No.: 12/732,134

(22) Filed: Mar. 25, 2010

(65) Prior Publication Data

US 2011/0236637 A1 Sep. 29, 2011

(51) Int. Cl.
*B32B 9/02* (2006.01)
*B32B 9/04* (2006.01)
*B32B 7/12* (2006.01)

(52) U.S. Cl.
CPC ............ *B32B 9/025* (2013.01); *B32B 7/12* (2013.01); *B32B 9/047* (2013.01); *B32B 2255/02* (2013.01); *B32B 2255/26* (2013.01); *B32B 2307/54* (2013.01); *B32B 2307/542* (2013.01); *B32B 2437/02* (2013.01); *B32B 2479/00* (2013.01); *B32B 2601/00* (2013.01); *Y10S 428/904* (2013.01); *Y10T 428/24438* (2015.01); *Y10T 428/24785* (2015.01)

(58) Field of Classification Search
CPC . B32B 9/025; B32B 2255/02; B32B 2255/26; B32B 2307/54; B32B 2307/542; B32B 2437/02; B32B 2479/00; B32B 2601/00; B32B 7/12; B32B 9/047; B32B 3/04; D06N 3/08; D06N 3/186; D06N 3/0018; D06N 3/0006–3/0013; Y10S 428/904
USPC ................. 442/327, 381–390; 428/904, 473; 428/119–126
See application file for complete search history.

(56) References Cited

U.S. PATENT DOCUMENTS

| | | | | |
|---|---|---|---|---|
| 3,007,826 A | * | 11/1961 | Brooksbank | F16G 1/02 156/137 |
| 3,362,036 A | * | 1/1968 | Swan | A43D 25/18 12/142 R |
| 3,496,056 A | * | 2/1970 | Butsch | B29C 70/08 428/904 |
| 3,713,938 A | * | 1/1973 | Sutton | 156/246 |
| 3,778,251 A | * | 12/1973 | Trask | A43D 11/00 12/146 D |
| 4,497,871 A | * | 2/1985 | Henke | 428/473 |
| 5,344,692 A | * | 9/1994 | Schmoock | 428/161 |
| 5,534,327 A | * | 7/1996 | Nishi | C08J 3/12 428/151 |

(Continued)

FOREIGN PATENT DOCUMENTS

WO WO 2008/059215 * 5/2008 ............... A43B 1/00

OTHER PUBLICATIONS

Polyurethane, thermoplastic properties, efunda, www/efunda.com downloaded Aug. 8, 2018 (Year: 2018).*

*Primary Examiner* — Jennifer A Steele
(74) *Attorney, Agent, or Firm* — Park & Associates IP Law, P. C.

(57) ABSTRACT

Disclosed therein is a reinforced leather. The reinforced leather includes: a leather sheet layer made of a leather-like material; a bonded layer positioned on an upper face of the leather sheet layer; a textile layer positioned on an upper face of the bonded layer and made of cotton fabrics; and a coated layer positioned on an upper face of the textile layer. The reinforced leather can remedy the shortcoming that leather-like materials produced from waste resources get torn easily, be used as leather for shoes due to its high tensile strength and shear strength, and provide a beautiful appearance.

2 Claims, 2 Drawing Sheets

(56) References Cited

U.S. PATENT DOCUMENTS

| | | | |
|---|---|---|---|
| 6,231,940 B1* | 5/2001 | Aichner | B32B 9/00 428/332 |
| 6,877,255 B2* | 4/2005 | O'Hare | A43B 1/14 36/1 |
| 2008/0271344 A1* | 11/2008 | Skirrow | A43B 1/02 36/114 |

* cited by examiner

REINFORCED LEATHER

BACKGROUND OF THE INVENTION

Field of the Invention

The present invention relates to a reinforced leather, and more particularly, to a reinforced leather, which can remedy the shortcoming that leather-like materials produced from waste resources get torn easily, which can be used as leather for shoes due to its high tensile strength and shear strength, and which can provide a beautiful appearance.

Background Art

In general, when leather is produced, saving scraps, which are sold wastes, are unavoidably generated in order to adjust thickness of leather.

Methods of producing multi-functional leather-like materials through various kinds of physical and chemical treatments utilizing the saving scraps have been disclosed.

The leather-like materials mean recycled materials of leather feeling made by utilizing leather wastes and other industrial wastes. Such leather-like materials may be used as interior materials for vehicles, interior decoration materials, and so on.

However, the previously disclosed leather-like materials have a shortcoming that they get torn easily due to weak tensile strength and shear strength.

Accordingly, it is necessary to develop leather, which can make up the shortcoming of the previously disclosed leather-like materials.

For your reference, a bonded leather has been widely used as one of the leather-like materials, and its customs logistics code, which is the same all over the world, is HS 4114.10-000.

SUMMARY OF THE INVENTION

Accordingly, the present invention has been made to solve the above-mentioned problems occurring in the prior arts, and it is an object of the present invention to provide a reinforced leather, which can remedy the shortcoming that leather-like materials produced from waste resources get torn easily, which can be used as leather for shoes or material for sofa sheets due to its high tensile strength and shear strength, and which can provide a beautiful appearance.

To accomplish the above object, in one aspect of the present invention, there is provided a reinforced leather including: a leather sheet layer made of a leather-like material; a bonded layer positioned on an upper face of the leather sheet layer; a textile layer positioned on an upper face of the bonded layer and made of cotton fabrics; and a coated layer positioned on an upper face of the textile layer.

Moreover, the coated layer is positioned on a lower face of the leather sheet layer.

Furthermore, in another aspect, there is provided a reinforced leather including: a leather sheet layer made of a leather-like material; a bonded layer positioned on an upper face and a lower face of the leather sheet layer; a textile layer positioned on an upper face of the bonded layer positioned on the upper face of the leather sheet layer and on a lower face of the bonded layer positioned on the lower face of the leather sheet layer to thereby surround the leather sheet layer, the textile layer being made of cotton fabrics; and a coated layer positioned on an upper face of the textile layer.

Additionally, the textile layer is made of one selected from synthetic resin or non-woven fabrics.

In addition, the bonded layer is one selected from urethane adhesives, acrylic adhesives and hot melt adhesives.

Moreover, the coated layer is formed by one selected from polyurethane coating (PU coating) and PVC coating.

The reinforced leather according to the present invention can remedy the shortcoming that the conventional leather-like materials produced from waste resources get torn easily, be used as leather for shoes due to its high tensile strength and shear strength, and provide a beautiful appearance.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
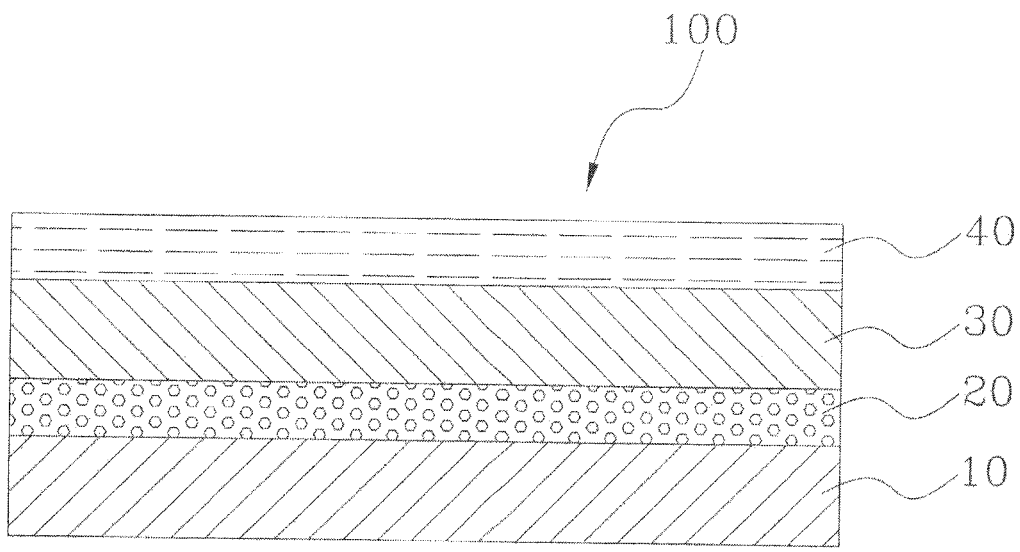
FIG. 1 is a sectional view of a reinforced leather according to a first preferred embodiment of the present invention.
Figure 2:
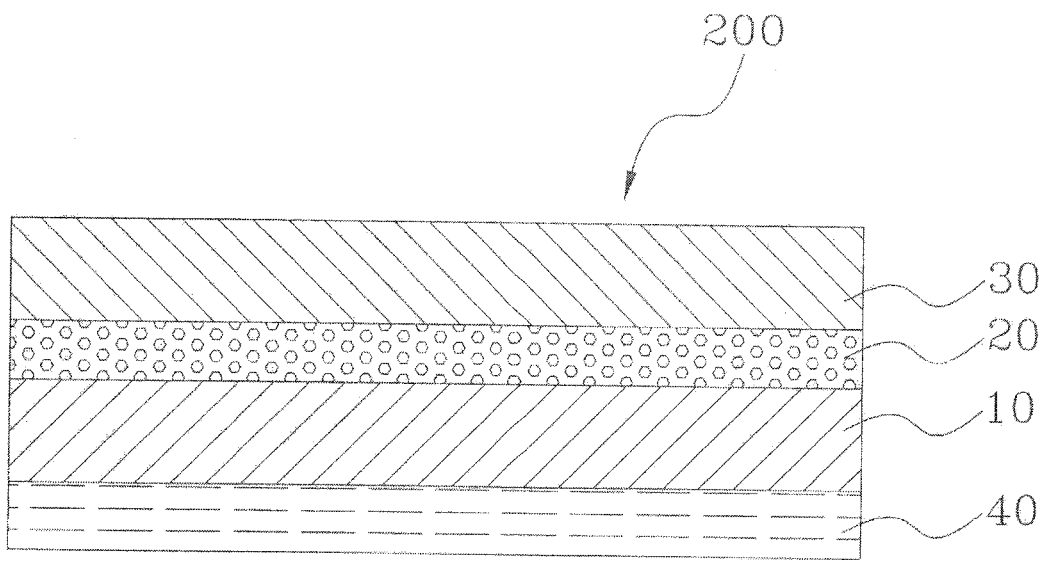
FIG. 2 is a sectional view of a reinforced leather according to a second preferred embodiment of the present invention.
Figure 3:
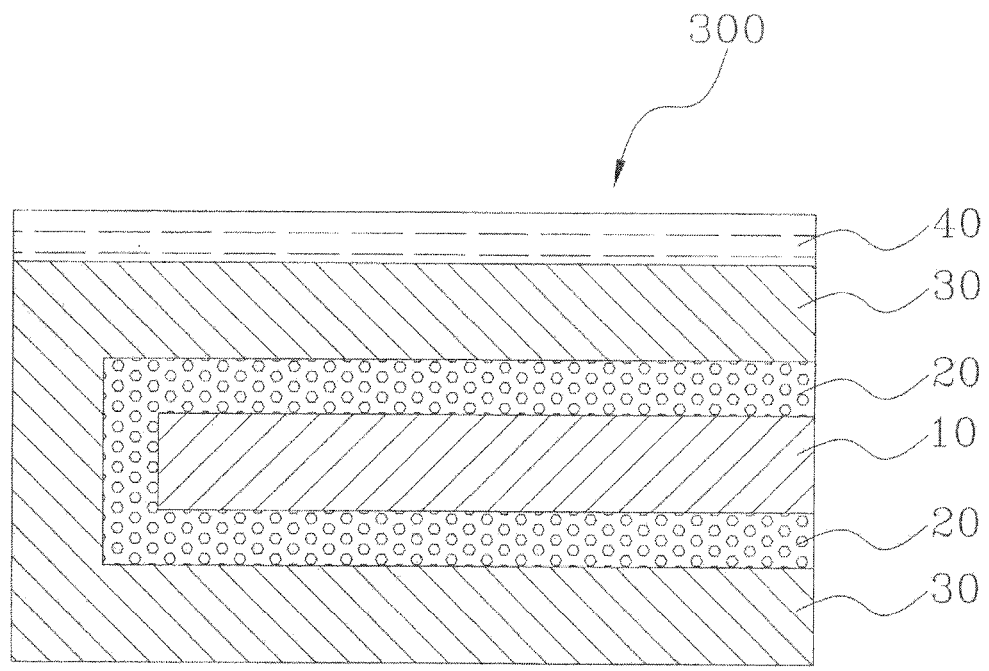
FIG. 3 is a sectional view of a reinforced leather according to a third preferred embodiment of the present invention.

FIGS. 1 to 3 illustrates a reinforced leather according to preferred embodiments of the present invention, wherein FIG. 1 is a sectional view of a reinforced leather according to a first preferred embodiment of the present invention, FIG. 2 is a sectional view of a reinforced leather according to a second preferred embodiment, and FIG. 3 is a sectional view of a reinforced leather according to a third preferred embodiment.

As shown in FIG. 1, the reinforced leather 100 according to the first preferred embodiment of the present invention includes a leather sheet layer 10, a bonded layer 20, a textile layer 30, and a coated layer 40.

The leather sheet layer 10 is made of a leather-like material, and the leather-like material is a previously developed and well-known technology as described above, and hence, detailed description thereof will be omitted.

The bonded layer 20 is positioned on the upper face of the leather sheet layer 10.

It is preferable that the bonded layer 20 is one selected from urethane adhesives, acrylic adhesives and hot melt adhesives.

The textile layer 30 is positioned on the upper face of the bonded layer 20 and is made of cotton fabrics.

Furthermore, of course, the textile layer 30 may be made of synthetic fiber or non-woven fabrics.

The coated layer 40 is positioned on the upper face of the textile layer 30.

It is preferable that the coated layer 40 is formed by one selected from polyurethane coating (PU coating) and PVC coating.

The reinforced leather 100 according to the first preferred embodiment having the above-mentioned structure is produced as follows.

First, as shown in FIG. 1, the bonded layer 20 is formed on the upper face of the leather sheet layer 10, and the textile layer 30 is bonded on the upper face of the bonded layer 20. After that, the coated layer 40 is formed on the upper face of the textile layer 30.

It is preferable that the coated layer 40 is formed by one selected from polyurethane coating (PU coating) and PVC coating, and the coating is achieved within a range of temperature from 70° C. to 80° C. The PU coating and PVC coating are widely known coating methods, and hence, detailed description thereof will be omitted.

In the meantime, FIG. 2 illustrates a reinforced leather 200 according to the second preferred embodiment of the present invention.

Referring to FIG. 2, the reinforced leather 200 of the second preferred embodiment is produced in the same way as that of the first preferred embodiment except that the coated layer 40 is positioned on the lower face of the leather sheet layer 10.

Moreover, FIG. 3 illustrates a reinforced leather 300 according to the third preferred embodiment of the present invention.

Referring to FIG. 3, the reinforced leather 300 has a structure that the textile layer 30 surrounds the leather sheet layer 10. For the rest, the reinforced leather 300 has the same structure as the first and second embodiments, and hence, its detailed description will be omitted.

As described above, since the textile layer 30 and the coated layer 40 are formed on the leather sheet layer 10 through the bonded layer, the reinforced leather according to the present invention can remedy the shortcoming that leather-like materials produced from waste resources get torn easily, be used as leather for shoes or material for sofa sheets due to its high tensile strength and shear strength, and provide a beautiful appearance.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A reinforced leather comprising:
    a leather sheet layer made of leather wastes, scrap leather, or recycled leather materials;
    a bonding layer of non-fibrous and singular layer, the bonding layer positioned directly on an upper face, a lower face, and only one side surface of the leather sheet layer to thereby surround three surfaces of the leather sheet layer;
    a textile layer positioned directly on an upper face of the bonding layer, on a lower face of the bonding layer, and on a corresponding one side surface of the bonding layer to thereby surround the bonding layer, the textile layer being made of cotton fabrics, synthetic resin or non-woven fabrics to enhance mechanical strength of the leather sheet layer; and
    a coating layer positioned directly on an upper face of the textile layer to further enhance mechanical strength of the leather sheet layer while also improving external appearance of the textile layer positioned on the upper face of the bonding layer;
    wherein the bonding layer is one selected from urethane adhesives, acrylic adhesives, and hot melted adhesives, to provide a bond of the upper face, the low face and the only one side surface of the leather sheet layer with the textile layer; and
    wherein the coating layer is one selected from a PVC layer and a polyurethane coating layer.

2. The reinforced leather comprising of claim 1, wherein the coating layer is achieved within a range of temperatures from 70° C. to 80° C.

* * * * *